United States Patent
Cioni et al.

(10) Patent No.: US 10,848,683 B2
(45) Date of Patent: Nov. 24, 2020

(54) METHOD FOR OBSERVING A SAMPLE BY LENSLESS IMAGING, WITH A SPATIAL DISPERSION IN THE SAMPLE TAKEN INTO ACCOUNT

(71) Applicant: Commissariat A L'Energie Atomique et aux Energies Alternatives, Paris (FR)

(72) Inventors: Olivier Cioni, Grenoble (FR); Thomas Bordy, Grenoble (FR); Camille Deforceville, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 16/445,415

(22) Filed: Jun. 19, 2019

(65) Prior Publication Data
US 2020/0014837 A1    Jan. 9, 2020

(30) Foreign Application Priority Data
Jun. 20, 2018  (FR) ...................................... 18 55464

(51) Int. Cl.
*G03H 1/04*        (2006.01)
*G02B 21/00*       (2006.01)
(Continued)

(52) U.S. Cl.
CPC ........... *H04N 5/2354* (2013.01); *G02B 21/06* (2013.01); *G02B 21/367* (2013.01); *G06K 9/00134* (2013.01); *H04N 5/2254* (2013.01)

(58) Field of Classification Search
CPC .... H04N 5/2354; H04N 5/2254; G02B 21/06; G02B 21/367; G06K 9/00134;
(Continued)

(56) References Cited

U.S. PATENT DOCUMENTS 9,715,099 B2 *   7/2017   Ozcan .................. G06T 3/0068
2018/0189963 A1   7/2018   Joly et al.
(Continued)

FOREIGN PATENT DOCUMENTS

| EP | 3 252 455 A1 | 12/2017 |
| FR | 3 061 297 A1 | 6/2018 |
| WO | WO 2018/060619 A1 | 4/2018 |

OTHER PUBLICATIONS

French Search Report dated Mar. 20, 2019 in French Application 18 55464 filed on Jun. 20, 2018 (with English Translation of Categories of Cited Documents & Written Opinion).
(Continued)

*Primary Examiner* — Susan E. Hodges
(74) *Attorney, Agent, or Firm* — Oblon, McClelland, Maier & Neustadt, L.L.P.

(57) ABSTRACT

Method for observing a sample comprising the steps of (a) illuminating the sample using a light source, the light source emitting an incident light wave that propagates toward the sample along a propagation axis (Z); (b) acquiring, using an image sensor, an image of the sample, which image is formed in a detection plane; (c) forming a stack of images, called reconstructed images, from the image acquired in step (b), each reconstructed image being obtained by applying, for one reconstruction distance, a numerical propagation operator; and (d) from each image of the stack of images, computing a clearness indicator for various radial positions, each clearness indicator being associated with one radial position and with one reconstruction distance.

14 Claims, 5 Drawing Sheets

(51) Int. Cl.
　　　*G06K 9/00*　　　(2006.01)
　　　*G06T 7/00*　　　(2017.01)
　　　*H04N 5/225*　　(2006.01)
　　　*H04N 5/235*　　(2006.01)
　　　*G02B 21/06*　　(2006.01)
　　　*G02B 21/36*　　(2006.01)

(58) Field of Classification Search
　　　CPC ......... G03H 1/0866; G03H 2001/0447; G03H
　　　　　　　　　1/0443; G03H 2001/0883; G03H 1/04;
　　　　　　　　　　　　　　　　　　　　　　G01N 15/1468
　　　USPC .......................................................... 348/40
　　　See application file for complete search history.

(56) References Cited

U.S. PATENT DOCUMENTS

2019/0086866 A1* 3/2019 Douet ...................... C12Q 1/20
2020/0033580 A1* 1/2020 Allier ................... G02B 21/362

OTHER PUBLICATIONS

Yu, X, et al, "Review of digital holographic microscopy for three-dimensional profiling and tracking", Optical Engineering, 2014, 22 pages.
Jacob P. Fugal, Tomothy J. Schulz, Raymond A. Shaw, "Practical Methods for Automated Reconstruction and Characterization of Particles in Digital In-line Holograms," May 21, 2009, Meas. Sci. Technol. (14 pages).
Onur Mudanyall, Cetin Oztoprak, Derek Tseng. Anthony Edinger, Aydogan Ozcan, "Detection of Waterborne Parasites Using Filed-Portable and Cost-Effective Lensfree Microscopy." The Royal Society of Chemistry, 2010.

* cited by examiner

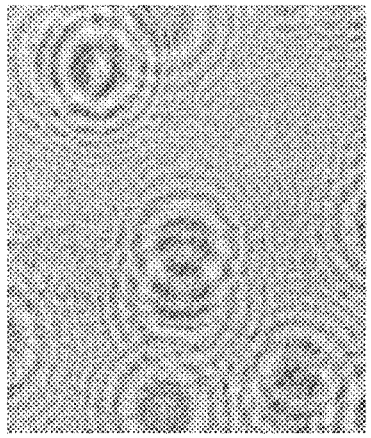 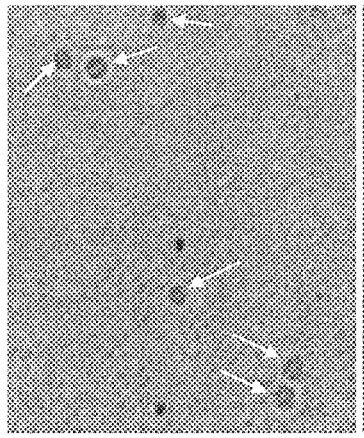 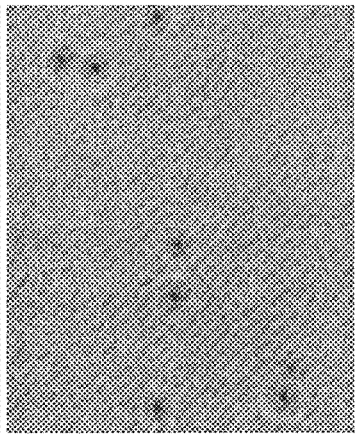
Fig. 2A  Fig. 2B  Fig. 2C
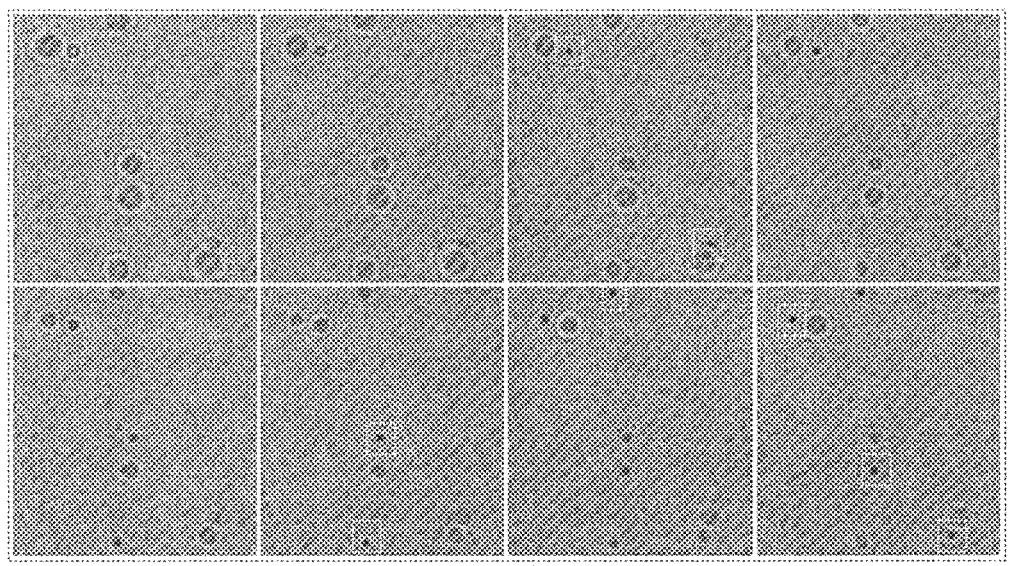
Fig. 2D

METHOD FOR OBSERVING A SAMPLE BY LENSLESS IMAGING, WITH A SPATIAL DISPERSION IN THE SAMPLE TAKEN INTO ACCOUNT

TECHNICAL FIELD

The technical field of the invention is observation of a sample, notably a sample containing particles, by lensless imaging, or by so-called defocused imaging.

PRIOR ART

Lensless imaging has developed over the last few years, and its applications to the characterization of samples have multiplied, for example in the field of medical diagnosis, cellular culture, biological analysis or in the field of food processing. Specifically this technique allows, at low cost, an image with a large field of view of a sample to be obtained. The application of holographic reconstruction algorithms to the images obtained in a lensless configuration allows exploitable images of samples to be achieved; this is a low-cost alternative to conventional microscopy, benefitting from a large field of view.

Various documents describe the use of lensless imaging to observe samples. For example, document WO2016189257 describes the application of lensless imaging, coupled with holographic reconstruction algorithms, to the observation of tissue slides for diagnostic purposes. Documents WO2016151248 and WO2017178723 describe the use of lensless imaging to characterize cells in a sample. The technique described in these documents is based on the acquisition of an image using an image sensor placed facing a sample. The application of a holographic reconstruction algorithm allows profiles representative of the light wave to which the image sensor is exposed to be formed. From the profiles, the cells placed in the sample are characterized. Employment of profiles makes it possible to achieve an insensitivity to the position of a cell to be characterized in the sample, and in particular to the distance between the cell and the sensor.

One difficulty associated with the application of holographic reconstruction algorithms is that it is necessary to know the distance between the image sensor and the sample. However, when the sample contains particles, the position of the latter, with respect to the image sensor, may vary in the thickness of the sample. Thus, images obtained by holographic reconstruction may be clear for certain particles, but hazy for other particles. The invention allows this difficulty to be overcome, by allowing an image to be formed in which various particles, located at various distances from the image sensor, appear clear, without requiring a multiplication of image acquisitions. Thus, the invention allows the depth of field of lensless imaging to be increased.

SUMMARY OF THE INVENTION

A first subject of the invention is a method for observing a sample comprising the following steps:
a) illuminating the sample using a light source, the light source emitting an incident light wave that propagates toward the sample along a propagation axis;
b) acquiring, using an image sensor, an image of the sample, which image is formed in a detection plane, the sample being placed between the light source and the image sensor, each image being representative of an exposure light wave, to which the image sensor is exposed under the effect of the illumination, the image comprising pixels, each pixel corresponding to a defined radial position in a plane parallel to the detection plane;
c) forming a stack of complex images, called reconstructed images, from the image acquired in step b), each reconstructed image being obtained by applying, for one reconstruction distance along the propagation axis, a numerical propagation operator, the stack of images comprising as many reconstructed images as there are different reconstruction distances, each reconstructed image being representative of an exposure light wave to which the image sensor is exposed;
d) from each image of the stack of images, computing a clearness indicator for various radial positions, each clearness indicator being associated with one radial position and with one reconstruction distance;
the method being characterized in that it also comprises the following steps:
e) taking into account a selection criterion;
f) for each radial position, and depending on the selection criterion, selecting one clearness indicator among the various clearness indicators defined, at the radial position, from the various reconstructed images, the selected clearness indicator being associated with a reconstructed image that is optimal for the radial position in question;
g) forming an observation image of the sample, each pixel of which is associated with one radial position, the value of pixels of the observation image, or even of each pixel of the observation image, being determined depending on the value, at the radial position of the pixel, of the optimal reconstructed image.

The method may comprise, following step f), determining, for each radial position in question, an optimal distance, corresponding to the reconstruction distance of the optimal reconstructed image associated with the radial position.

According to one embodiment, each clearness indicator is computed from one elementary image, the elementary image being established from the modulus and/or the argument and/or the real part and/or the imaginary part of a reconstructed image. An elementary image corresponds to an image formed from scalar values, and obtained from a reconstructed image. Step d) may comprise, for each radial position in question, computing a gradient of the elementary image, in the radial position, in a gradient direction.

According to one embodiment, step d) comprises, for each reconstructed image of the stack of images:
computing a gradient image representative of a gradient of the reconstructed image in at least one gradient direction;
computing a norm of the gradient image;
such that the clearness indicator, in each radial position, is obtained from the norm of the gradient image at the radial position.

Step f) may comprise taking into account a range of validity, and rejecting a selected clearness indicator if the reconstruction distance that is associated therewith is not comprised in the range of validity.

In step g), the observation image, at each radial position, may be obtained from the optimal reconstructed image for the radial position in question.

According to one embodiment, no image-forming optic is placed between the sample and the image sensor. According to another embodiment, an optical system is placed between the sample and the image sensor, the optical system conjugating an image plane with an object plane, the detection plane being distant with respect to the image plane or the sample being distant from the object plane, the detection plane being offset with respect to the image plane and/or the sample being offset from the object plane, such that the image acquired by the image sensor is a defocused image of the sample.

The sample may be held in or on a holding element, the sample being immobile with respect to the holding element.

The sample may contain particles. The method may then comprise a step h) of characterizing the particles from the observation image of the sample, the characterization comprising:
- counting the particles;
- and/or determining a size and/or a shape of the particles;
- and/or counting particles depending on their size and/or their shape;
- and/or determining a three-dimensional position of the particles.

The particles may be immobile with respect to the holding element.

A second subject of the invention is a device for identifying a sample, comprising:
- a light source configured to emit an incident light wave that propagates toward the sample;
- an image sensor;
- a holder, configured to hold the sample between the light source and the image sensor;
a processor, configured to receive an image of the sample, which image is acquired by the image sensor, and to implement steps c) to g) of a method according to the first subject of the invention.

According to one embodiment, no image-forming optic is placed between the sample and the image sensor.

According to one embodiment, the device comprises an optical system defining a focused configuration, in which the image sensor is conjugated with a plane passing through the sample, the device being such that the image sensor or the sample are offset with respect to the focused configuration, such that, in step b), the image sensor acquires a defocused image of the sample.

Other advantages and features will become more clearly apparent from the following description of particular embodiments of the invention, which are given by way of nonlimiting example, and shown in the figures listed below.

FIGURES

FIG. 1A shows an example device according to the invention. FIG. 1B shows a light source in one embodiment of the invention.

FIG. 2 a shows an image of a sample, said image being acquired by an image sensor.

FIG. 2B shows a reconstructed image according to the prior art, an "average" reconstruction distance being considered.

FIG. 2C shows an image designated by the term "observation image", obtained by implementing the invention.

FIG. 2D shows images, called elementary images, obtained on the basis of complex images reconstructed at various reconstruction distances. The elementary images form a stack of elementary images of the sample.

SUMMARY OF PARTICULAR EMBODIMENTS

Figure 1A:
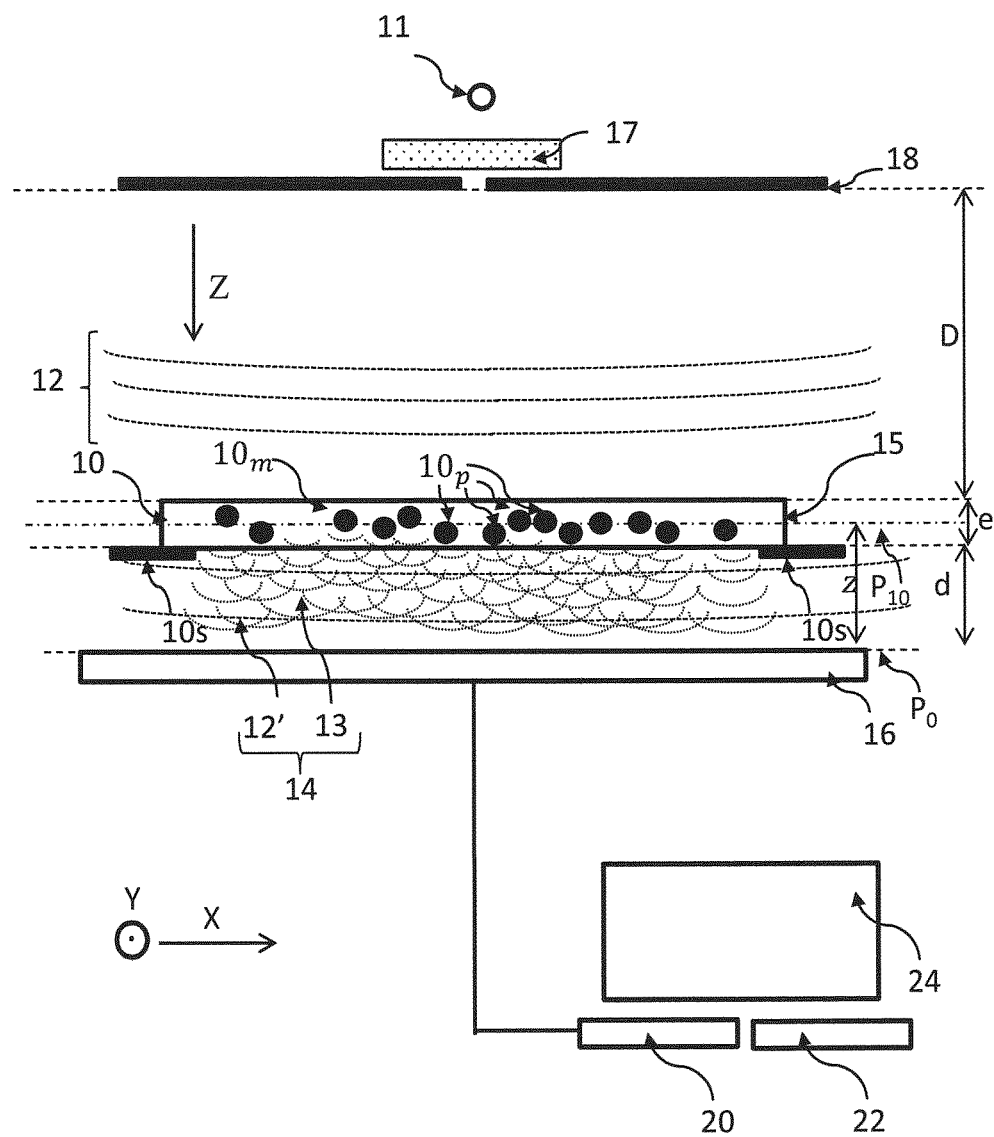

FIG. 1A shows an example of a device according to the invention. A light source 11 is configured to emit a light wave 12, called the incident light wave, that propagates in the direction of a sample 10, along a propagation axis Z. The light wave 12 is emitted in an illumination spectral band $\Delta\lambda$.

The sample 10 is a sample that it is desired to characterize. The sample comprises a medium 10m, for example a liquid medium, in which particles 10p bathe. The particles may be cells, or microorganisms, or microalgae, or fragments thereof. By microorganism, what is notably meant is a yeast, a bacterium, a spore, or a fungus. The term particles may also designate solid particles, in particular microspheres, for example metal microspheres, glass microspheres or organic microspheres, which are commonly implemented in biological protocols. It may also be a question of insoluble droplets bathing in a liquid medium, for example lipid droplets in an oil-in-water emulsion. The particles may have a diameter or a diagonal smaller than 100 μm. They may be inscribed in a circle or a sphere the diameter of which is smaller than 100 μm.

The medium 10m may be a solid medium or a medium forming a gel. The medium 10m may comprise a bodily liquid, for example, and nonlimitingly, blood, urine, lymph, or cerebrospinal fluid. It may be a question of a culture medium, propitious for the development of cells or microorganisms.

The sample 10 is held by a holding element 15. The function of the holding element is to hold the sample facing the image sensor 16. It is preferably transparent or translucent. The holding element may be a transparent plate, for example a glass plate, or a fluidic chamber. In the example shown in FIG. 1A, the holding element 15 is a Gene Frame® fluidic chamber of thickness e=250 μm. The thickness e of the sample 10, along the propagation axis Z, typically varies between 10 μm and 1 cm, and is preferably comprised between 20 μm and 1 mm. The sample 10 is held on a holder 10s at a distance d from an image sensor 16.

The distance D between the light source 11 and the fluidic chamber 15 is preferably larger than 1 cm. It is preferably comprised between 2 and 30 cm. Advantageously, the light source, seen by the sample, may be considered to be point like. This means that its diameter (or its diagonal) is preferably smaller than one tenth, and better still one hundredth, of the distance between the fluidic chamber 15 and the light source. In FIG. 1, the light source is a light-emitting diode. It is generally associated with a diaphragm 18, or spatial filter. The aperture of the diaphragm is typically comprised between 5 μm and 1 mm, and preferably between 50 μm and 500 μm. In this example, the diaphragm is supplied by Thorlabs under the reference P150S and its diameter is 150 μm. The diaphragm may be replaced by an optical fibre, a first end of which is placed facing the light source 11 and a second end of which is placed facing the sample 10. The device shown in FIG. 1 also comprises a diffuser 17, placed between the light source 11 and the diaphragm 18. The use of such a diffuser makes it possible to dispense with constraints on the centralness of the light source 11 with respect to the aperture of the diaphragm 18. The function of such a diffuser is to distribute the light beam produced by an elementary light source 11 over a cone of angle α. Preferably, the diffusion angle varies between 10° and 80°. Alternatively, the light source may be a laser source, such as a laser diode. In this case, it is not recommended to associate it with a spatial filter or a diffuser, as described in document US2017317125.

Preferably, the emission spectral band Δλ of the incident light wave 12 has a bandwidth narrower than 100 nm. By spectral bandwidth, what is meant is a full width at half maximum of said spectral band.

Figure 1B:
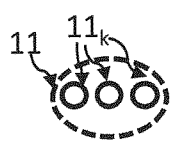

According to one embodiment, the light source 11 comprises a plurality of elementary light sources $11_k$, each being configured to emit an incident light wave $12_k$ in a spectral band $\Delta\lambda_k$. Such a light source is shown in FIG. 1B. Preferably, the spectral bands $\Delta\lambda_k$ of the various light sources $11_k$ are different from one another. Such a configuration is described in document WO2016189257.

The sample 10 is placed between the light source 11 and an image sensor 16. The image sensor 16 is configured to form an image $I_0$ of the sample 10 in a detection plane $P_0$. In the example shown, it is a question of an image sensor comprising a matrix array of CCD pixels, or a CMOS sensor. The pixel matrix array forms the detection plane $P_0$. The detection plane $P_0$ preferably lies perpendicular to the propagation axis Z of the incident light wave 12. The detection plane lies in a radial plane XY, defined by two axes X and Y, the radial plane being perpendicular to the propagation axis Z.

The distance d between the sample 10 and the matrix array of pixels of the image sensor 16 is preferably comprised between 50 μm and 2 cm, and preferably comprised between 100 μm and 2 mm.

In this embodiment, the absence of magnifying or image-forming optic between the image sensor 16 and the sample 10 will be noted. This does not prevent focusing micro-lenses possibly being present level with each pixel of the image sensor 16, said micro-lenses not performing the function of magnifying the image acquired by the image sensor, their function being to optimize the efficiency with which light is collected by the pixels.

Under the effect of the incident light wave 12, the particles present in the sample may generate a diffracted wave 13, liable to generate, in the detection plane $P_0$, interference, in particular with a portion of the incident light wave 12' transmitted by the sample. Moreover, the sample may absorb a portion of the incident light wave 12. Thus, the light wave 14, transmitted by the sample, and to which the image sensor 16 is exposed, which wave is designated by the term "exposure wave", may comprise:
 a component 13 resulting from diffraction of the incident light wave 12 by each particle of the sample;
 a component 12' resulting from transmission of the incident light wave 12 by the sample, a portion of the latter possibly being absorbed in the sample.

These components interfere in the detection plane. Thus, the image acquired by the image sensor contains interference patterns (or diffraction patterns), due to the various particles of the sample.

A processor 20, for example a microprocessor, is configured to process each image $I_0$ acquired by the image sensor 16, according to the steps described below. In particular, the processor is a microprocessor connected to a programmable memory 22 in which a sequence of instructions for carrying out the image-processing and computing operations described in this description is stored. The processor may be coupled to a screen 24 allowing the images acquired by the image sensor 16 or computed by the processor 20 to be displayed.

Because of the absence of image-forming optic, an image $I_0$ acquired by the image sensor 16, which image is also called a hologram, does not allow a sufficiently precise representation of the observed sample to be obtained. The acquired image $I_0$ may notably comprise a high number of interference patterns, and may not be easily exploitable to identify the particles present in the sample.

FIG. 2A shows such an image, the sample being formed of spheres of polystyrene of 5 μm diameter bathing in water. FIG. 2A was obtained by placing a sample 10 at a distance of 700 μm from a monochromic 8-bit CMOS image sensor 16 comprising 3884×2764 pixels, each pixel having a 1.67 μm side length. The light source was a Cree MC-E Color light-emitting diode, comprising three light-emitting diodes able to be simultaneously or successively activated, each diode respectively emitting in the following spectral bands Δλ: 450 nm-465 nm; 520 nm-535 nm; 620 nm-630 nm. Only the spectral band 450 nm-465 nm was employed. The light source was placed at a distance of 5 cm from the sample.

It is possible to apply, to the image $I_0$ acquired by the image sensor, a holographic propagation operator h, so as to compute a quantity representative of the exposure light wave 14. It is then possible to reconstruct a complex expression A for the light wave 14 at any point of spatial coordinates (x,y,z), and in particular in a reconstruction plane $P_z$ located at a distance |z| from the image sensor 16, called the reconstruction distance, this reconstruction plane being for example the plane $P_{10}$ in which the sample lies, with:

$$A(x,y,z) = I_0(x,y,z) * h \quad (1) \text{*designating the convolution operator.}$$

The function of the propagation operator h is to describe the propagation of the light between the image sensor 16 and a point of coordinates (x,y,z), which point is located at a distance |z| from the image sensor. It is then possible to determine the modulus M(x,y,z) and/or the phase φ(x,y,z) of the light wave 14, at the distance |z|, with:

$$M(x,y,z) = \text{abs}[A(x,y,z)];$$

$$\varphi(x,y,z) = \arg[A(x,y,z)].$$

The operators abs and arg designate the modulus and argument, respectively.

The propagation operator is for example the Fresnel-Helmholtz function, such that:

$$h(x,y,z) = \frac{1}{j\lambda z} e^{i2\pi \frac{z}{\lambda}} \exp\left(i\pi \frac{x^2+y^2}{\lambda z}\right) \text{ with } i^2 = -1.$$

In other words, the complex expression A of the light wave 14, at any point of spatial coordinates (x,y,z), is such that: $A(x,y,z) = M(x,y,z) e^{i\varphi(x,y,z)}$.

In the rest of this description, the coordinates (x,y) designate a radial position in a radial plane XY parallel to the detection plane. The coordinate z designates a coordinate along the propagation axis Z.

The complex expression A is a complex quantity the argument and the modulus of which are representative of the phase and of the intensity of the exposure light wave 14 detected by the image sensor 16, respectively. The product of convolution of the image $I_0$ by the propagation operator h allows a complex image $A_z$ representing a spatial distribution of the complex expression A in a reconstruction plane $P_z$ lying at a distance $|z|$ from the detection plane $P_0$ to be obtained. In this example, the equation of the detection plane $P_0$ is $z=0$. The complex image $A_z$ corresponds to a complex image of the sample in the reconstruction plane $P_z$. The image $A_z$ is defined at radial coordinates (x,y), such that $A_z(x,y)=A(x,y,z)$. The image $A_z$ also represents a two-dimensional spatial distribution of the complex expression of the exposure wave 14. Such a method, designated by the term holographic reconstruction, notably allows an image of the modulus or of the phase of the exposure light wave 14 in the reconstruction plane to be reconstructed. To do this, images $M_z$ and $\varphi_z$ respectively representing the modulus or the phase of the complex image $A_z$ may be formed, with $M_z=\mod(A_z)$ and $\varphi_z=\arg(A_z)$.

The application of a holographic reconstruction operator to an acquired image, according to Expression (1), may be accompanied by the formation of noise affecting the reconstructed images. In order to limit the appearance of this noise, the application of the holographic reconstruction operator is carried out using iterative holographic reconstruction algorithms. Such algorithms are for example described:

in document WO2016189257, in particular in steps 100 to 150 described in the latter;

or in document WO2017162985, and more precisely according to steps 110 to 160 described in the latter.

The image shown in FIG. 2B was obtained by applying a holographic reconstruction algorithm, such as described in WO2017162985, to the image shown in FIG. 2A. FIG. 2B shows an image of the modulus $M_z$ of a reconstructed complex image $A_z$, the reconstruction distance z corresponding to a distance between a median plane $P_{10}$ of the sample and the image sensor 16. The median plane $P_{10}$ of the sample lies parallel to the detection plane, at the midpoint of the thickness of the sample. Such an image allows an acceptable observation of the sample. However, certain particles, indicated by an arrow, appear in the form of concentric rings. Such particles are located at a distance from the image sensor different from the reconstruction distance in question. They are a distance away from the median plane $P_{10}$. Therefore, they do not appear clearly in the image reconstructed in the median plane. Thus, the images obtained from the modulus or from the phase of the exposure light wave 14 allow an acceptable observation of the sample 10, and in particular of particles $10_p$ located at a distance from the image sensor 16 corresponding to the reconstruction distance. However, particles located at a distance from the image sensor 16 larger or smaller than the reconstruction distance do not appear clearly in these images.

Figure 3:
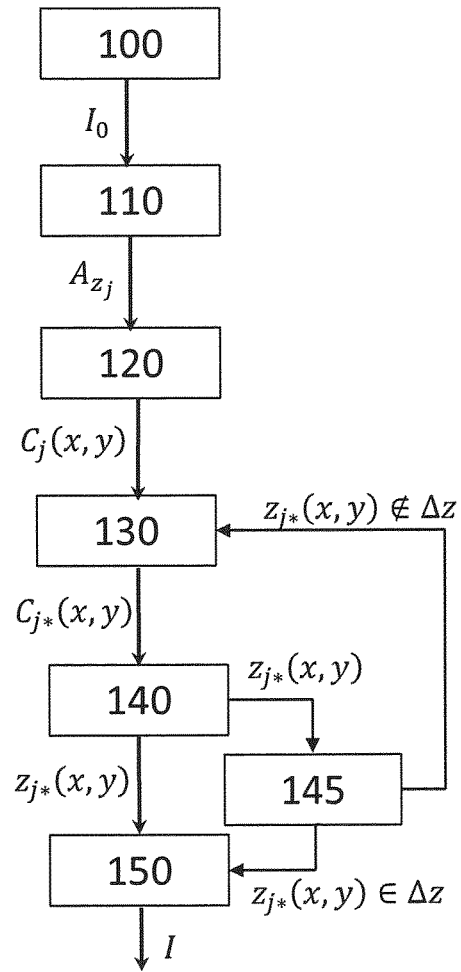
FIG. 3 illustrates the main steps of a method according to the invention.

The inventors have developed a method allowing this to be remedied, the main steps of which are described below, with reference to FIG. 3.

Step 100: Acquiring an image $I_0$ of the sample 10 with the image sensor 16, this image forming a hologram. One of the advantages of the lensless configuration shown in FIG. 1A is the large field of view, allowing a large volume of sample to be addressed simultaneously. The field of view depends on the size of the image sensor, it being slightly smaller than the detection area of the latter because of the spacing between the pixels of the sensor and the sample. The field of view is generally larger than 10 mm², and typically comprised between 10 mm² and 50 mm², this being significantly larger than with a conventional microscope.

Step 110: Obtaining a stack of reconstructed images.

This step comprises reconstructing a plurality of complex images by carrying out holographic reconstructions at various reconstruction distances $z_j$ from the detection plane $P_0$. A stack of complex images $A_{z_j}$ is then obtained. Each complex image $A_{z_j}$ of the stack of images is reconstructed at a reconstruction distance $z_j$, such that $z_{j=1} \leq z_j \leq z_{i=j}$, with:

$z_{j=1}$ being the minimum distance, from the image sensor, along the axis Z, at which a complex image $A_{z_{j=1}}$ is reconstructed $z_{j=J}$ being the maximum distance, from the image sensor, along the axis Z, at which a complex image $A_{z_{j=1}}$ is reconstructed Each index j is a natural integer indexing one reconstruction distance, with $1 \leq j \leq J$, J being the number of complex images $A_{z_j}$ in the stack of images.

Preferably, the reconstruction distances $z_j$ encompass the sample 10. If the sample lies, along the propagation axis Z, between two distances $z_{min}$ and $z_{max}$, with respect to the image sensor 16, with $z_{min} < z_{max}$, the minimum and maximum reconstruction distances $z_{j=1}$ and $z_{j=J}$ are such that $z_{j=1} \leq z_{min} < z_{max} \leq z_{j=J}$.

The respective reconstruction distances $z_j$, $z_{j+1}$ of two adjacent reconstructed images $A_{zj}$, $Az_{j+1}$ may be separated by a distance comprised between 5 μm and 100 μm, this distance corresponding to a reconstruction pitch.

Each complex image $A_{z_j}$ of the stack of images may be obtained from the image $I_0$ acquired in step 100, using the various reconstruction distances $z_{j=1} \bullet z_j \bullet \bullet z_{j=J}$. Preferably, each complex image $A_{z_j}$ is reconstructed by applying a reconstruction algorithm that limits reconstruction noise, as described above. It is for example possible to use an algorithm described in WO2017162985. By "from", what is meant is from the acquired image $I_0$ itself or from an image obtained by processing the acquired image $I_0$, for example from the image after it has been normalized or the image after its square root has been taken into account.

The stack of complex images may be established using the method described in WO2017178723.

At the end of step 110, a stack of complex images $A_{z_j}$ is obtained, each complex image being representative of the exposure light wave 14, in a reconstruction plane located at a distance $z_j$ from the detection plane $P_0$. Each complex image $A_{z_j}$ is defined using radial coordinates (x,y), in a plane parallel to the detection plane $P_0$.

FIG. 2D shows a few images, called elementary images, obtained from a stack of complex images reconstructed, at various reconstruction distances, from the image of FIG. 2A. The reconstruction pitch is 10 μm.

Step 120: Computing a clearness indicator for various radial positions (x,y), along the propagation axis Z.

In this step, a variation in a clearness indicator $C_j(x,y)$ along the propagation axis Z is determined for a plurality of radial positions (x,y). In other words, for each radial position (x,y), this step comprises computing a clearness indicator $C_j(x,y)$, at the radial position in question, of each image $A_{z_j}$ of the stack of images. Thus, a variation in the clearness indicator $C_j(x,y)$ as a function of reconstruction distance $z_j$ is obtained.

Each reconstructed image $A_{z_j}$ is a complex image. The clearness indicator $C_j(x,y)$ of each image $A_{z_j}$ of the stack of images at a radial coordinate (x,y), may be calculated by considering an image, called the elementary image $I_{z_j}$, obtained from the complex image. The elementary image may be:

an image of the modulus $M_{z_j}$ of each complex image $A_{z_j}$, with $I_{z_j}(x,y) = M_{z_j}(x,y) = \mod(A_{z_j}(x,y))$;

an image of the phase $\varphi_{z_j}$ of each complex image $A_{z_j}$, with $I_{z_j}(x,y)=\varphi_{z_j}(x,y)=\arg(A_{z_j}(x,y))$;

an image of the real part $Re_{z_j}$ of each complex image $A_{z_j}$, with $Re_{z_j}(x,y)=Re(A_{z_j}(x,y))$, Re designating an operator that returns the "real part";

an image of the imaginary part $Im_{z_j}$ of each complex image $A_{z_j}$, with $Re_{z_j}(x,y)=Im(A_{z_j}(x,y))$, Im designating an operator that returns the "imaginary part";

Generally, an elementary image $I_{z_j}$ is an image formed from scalar quantities obtained from a reconstructed complex image $A_{z_j}$. An elementary image allows the complex image from which it was obtained to be viewed. An elementary image may in particular be established from the modulus and/or phase and/or real part and/or imaginary part of a reconstructed complex image $A_{z_j}$.

The clearness indicator $C_j(x,y)$ of each complex image $A_{z_j}$ may be established from the elementary image $I_{z_j}$. For example, the elementary image $I_{z_j}$ is an image $M_{z_j}$ of the modulus of the complex image. The clearness indicator may then be established by considering a gradient of the elementary image in one or more directions, and for example along the two orthogonal axes X and Y defining the radial plane XY. In this example, the clearness indicator $C_j(x,y)$ is obtained by:

Computing a gradient of the image, along the axis X, of the modulus $M_{z_j}$ in each radial position (x,y), so as to obtain an image of the gradient along the axis X, which image is denoted $G_X(I_{z_j}(x,y))$, with, in this example, $G_X(I_{z_j}(x,y))=G_X(M_{z_j}(x,y))$. The gradient image may be obtained by applying a Sobel filter to the image $I_{z_j}$.

Computing a gradient of the image, along the axis Y, of the modulus $M_{z_j}$ in each radial position (x,y), for example by applying a Sobel filter, so as to obtain an image of the gradient along the axis Y, which image is denoted $G_Y(I_{z_j}(x,y))$, with, in this case, $G_Y(I_{z_j}(x,y))=G_Y(M_{z_j}(x,y))$.

Combining the gradient images thus computed, so as to form a two-dimensional gradient image $G_{XY}$. The two-dimensional gradient image $G_{XY}$ may be obtained by calculating a norm, such that:

$$G_{XY}(x,y)=|G_X(M_{z_j}(x,y))|+|G_Y(M_{z_j}(x,y))| \quad \text{(norm of order 1)}$$

$$\text{or } G_{XY}(x,y)=|G_X(M_{z_j}(x,y))|^2+|G_Y(M_{z_j}(x,y))|^2 \quad \text{(norm of order 2)}$$

The two-dimensional gradient image then forms, in each radial position (x,y), an indicator $C_j(x,y)$ of the clearness of the complex image $A_{z_j}$, such that $C_j(x,y)=G_{XY}(x,y)$. Thus, each clearness indicator is determined by considering pixels, of a given image, that are adjacent to a given pixel. This is particularly suitable for samples containing contrasted objects, for example contrasted particles.

The two-dimensional gradient image thus obtained is representative of a two-dimensional gradient of the reconstructed complex image $A_{z_j}$. Although described with reference to an image of the modulus of the complex image, the clearness indicator may be obtained with another component of the complex image, for example an image of the phase of the reconstructed complex image $A_{z_j}$, or of its real part, or of its imaginary part.

The clearness indicator may be established, at each reconstruction distance and at each radial position, from an elementary image containing the modulus, and/or the phase, and/or the real part, and/or the imaginary part of the reconstructed complex images, by considering the intensity of these images. The clearness indicator may be established from the intensity of such images.

Following step 120, a clearness indicator $C_j(x,y)$ is obtained for each radial position (x,y) corresponding to one pixel of the complex image $A_{z_j}$, for each reconstruction distance $z_j$.

Step 130: Selecting an optimal clearness indicator $C_{j*}(x,y)$ for each radial position (x,y).

In this step, for each radial position (x,y), among the clearness indicators $C_j(x,y)$ ($1 \leq j \leq J$) corresponding to the radial position, an optimal clearness indicator $C_{j*}(x,y)$ meeting a preset selection criterion is selected. The optimal clearness indicator $C_{j*}(x,y)$ thus selected may be the maximum clearness indicator, in which case $C_{j*}(x,y)=\max_j C_j(x,y)$. It may also be a question of the minimum clearness indicator, in which case $$C_{j*}(x,y) = \min_j C_j(x,y).$$

In the stack of the elementary images illustrated in FIG. 2D, radial positions in which the clearness indicator is optimal have been framed in certain elementary images. The framed radial positions correspond to particles.

Step 140: Determining an optimal reconstruction distance $z_{j*}$ for each radial position (x,y) in question.

The selection of the optimal clearness indicator $C_{j*}(x,y)$ allows, for each radial position, a reconstruction distance, called the optimal reconstruction distance $z_{j*}(x,y)$, which distance is associated with the optimal clearness indicator, to be established. At this optimal reconstruction distance $z_{j*}(x,y)$, for the radial position (x,y) in question, the complex image $A_{z_{j*}}$ is considered to be clear.

Thus, if an image $A_{z_j}$ is considered to be clear at a radial position (x,y) when the clearness indicator is maximum, for each radial position (x,y) an optimal reconstruction distance $z_{j*}(x,y)$ is obtained such that:

$$j*=\mathrm{argmax}(C_j(x,y)).$$

When $A_{z_j}$, at a radial position (x,y), is considered to be clear when the clearness indicator is minimum, for each radial position (x,y) an optimal reconstruction distance $z_{j*}(x,y)$ is obtained such that:

$$j*=\mathrm{argmin}(C_j(x,y)).$$

At the end of this step, a list of three-dimensional positions $(x,y,z_{j*}(x,y))$ for which the observation of the sample is considered to be clear is obtained.

Step 150: Forming an observation image I of the sample.

In this step, a clear image of the sample is formed from the stack of complex images, by considering the three-dimensional positions $(x,y,z_{j*}(x,y))$ at which a complex image $A_{z_{j*}}$ is considered to be clear.

The observation image I of the sample may be formed from the modulus of the complex images of the stack of images. In this case, the observation image of the sample is such that $I(x,y)=\mathrm{mod}(A_{z_{j*}}(x,y))$. The observation image I of the sample may be formed from the phase of the complex images of the stack of images. In this case, the observation image of the sample is such that $I(x,y)=\arg(A_{z_{j*}}(x,y))$. The observation image I may also be obtained from the real part or from the imaginary part of the complex images forming the stack of images.

FIG. 2C corresponds to an observation image I of the sample, said image being obtained from a stack of reconstructed complex images on the basis of the acquired image $I_0$ shown in FIG. 2A. Certain elementary images, obtained from the modulus of the complex images forming the stack of complex images, are shown in FIG. 2D. The observation image was obtained by considering the modulus of the complex images forming the stack of complex images.

FIG. 2C corresponds to one implementation of the invention, whereas FIG. 2B corresponds to the prior art. It may be seen that the invention allows more precise observation of the particles forming the sample, even though the latter are spatially dispersed, in particular along the propagation axis Z.

Figure 4A:
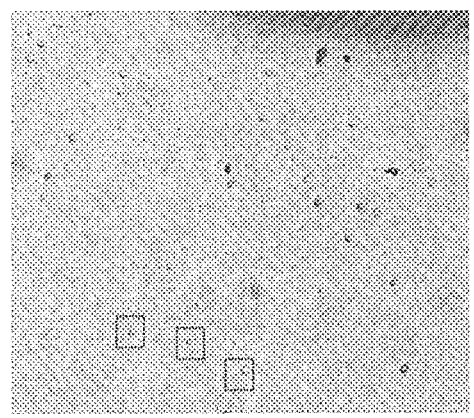
FIGS. 4A and 4B are images of the same sample, said images being obtained using a microscope in two different focal planes, respectively.
Figure 4B:
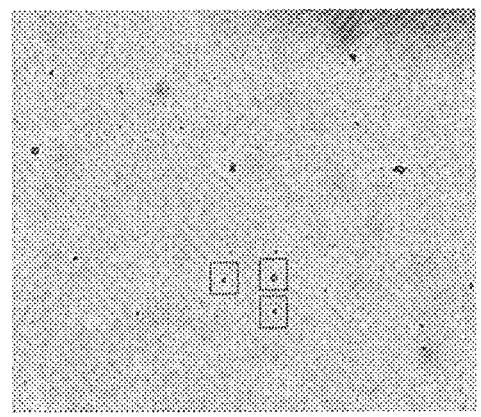
Figure 4C:
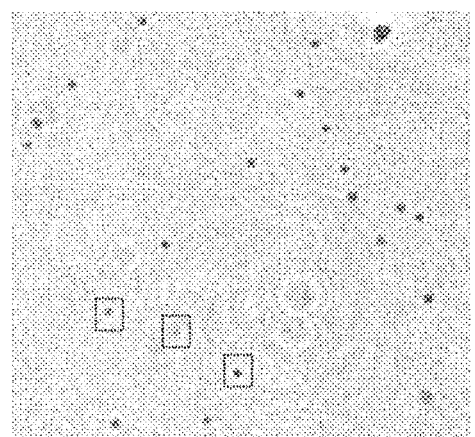
FIGS. 4C and 4D are images of the sample shown in FIGS. 4A and 4B, these images being obtained by lensless imaging according to the prior art and by implementing the invention, respectively.
Figure 4D:
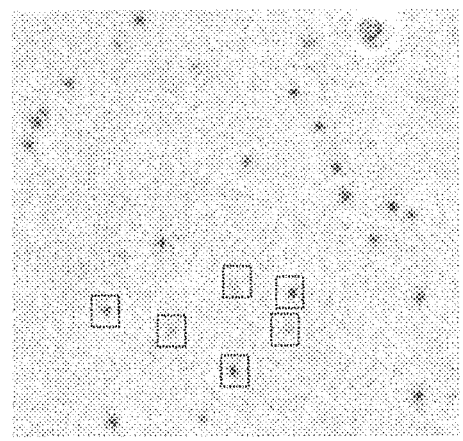

FIGS. 4A and 4B are images of a sample, said images respectively being taken, using a microscope, in two different focal planes. The sample contains yeasts of the *Saccharomyces cerevisiae* type bathing in a YPD culture medium, which is known to those skilled in the art. The yeasts that appear clearly have been framed. The sample is held in a fluidic chamber of 250 μm thickness. An image $I_0$ of the sample was acquired using a device such as shown in FIG. 1A. FIG. 4C corresponds to an elementary image, corresponding to the modulus of a complex image reconstructed at a reconstruction distance corresponding to the median plane $P_{10}$ of the sample. From the complex image reconstructed for the median plane of the sample, a stack of complex images is formed, in a range of reconstruction distances extending from −200 μm to +200 μm from the median plane of the sample, with a pitch of 10 μm. FIG. 4D corresponds to an observation image I of the sample, said image being obtained by implementing the invention, and considering the modulus of the complex images of the stack of images. It may be seen that:
- to obtain a correct observation of the sample with the microscope, a plurality of images must be acquired, in various focal planes;
- the reconstruction according to the prior art gives only a partial image of the sample, certain particles being poorly represented, in particular the particles framed in FIG. 4B;
- the observation image I according to the invention allows, from a single acquisition $I_0$, a correct representation of the particles of the sample to be obtained, whatever their distance with respect to the image sensor 16 (see FIG. 4D);
- the observation image I allows, from a single image, the observed particles to be counted, or their geometric shapes or respective appearances to be determined. It is also possible to count the particles depending on their shapes.

Figure 5A:
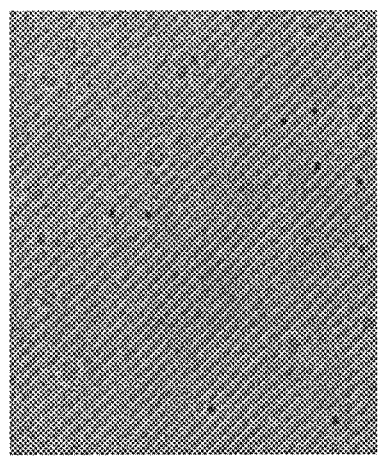
FIGS. 5A and 5B are images of a sample, said images being obtained by lensless imaging according to the prior art and by implementing the invention, respectively.
Figure 5B:
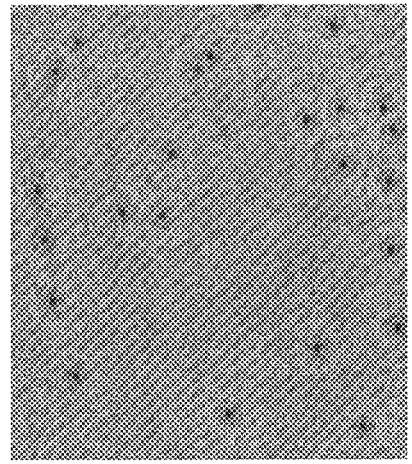

FIGS. 5A and 5B were obtained using a sample containing spheres of PET (polyethylene terephthalate) of 5 μm diameter bathing in water. An image $I_0$ of the sample was acquired using a device such as shown in FIG. 1A. FIG. 5A is an elementary image obtained considering the modulus of a complex image obtained by reconstruction from the acquired image $I_0$ of the sample, a reconstruction distance corresponding to the median plane of the sample being considered. From the complex image reconstructed at the median plane of the sample, a stack of complex images was formed, in a range of reconstruction distances from −400 μm to +200 μm with respect to the median plane of the sample, with a reconstruction pitch of 10 μm between two adjacent reconstructed images. FIG. 5B corresponds to an observation image I of the sample, said image being obtained by implementing the invention using the modulus of the complex images of the stack of images. It may be seen in FIG. 5A that certain particles do not appear clearly, because they are located a distance away from the reconstruction distance in question. In FIG. 5B, all the particles appear correctly, so as to allow them to be counted or the shape thereof assessed.

According to one embodiment, the method comprises an optional step 145 in which, for each radial coordinate (x,y) in question, the optimal distance $z_{j*}(x,y)$ obtained following steps 130 and 140 is selected. In this selection, when, for a radial position (x,y), the optimal distance is located outside of a range of validity Δz defined beforehand, it is invalidated. The range of validity Δz for example corresponds to a distance range $[z_{min}, z_{max}]$ bounding the sample. Thus, if $z_{j*}(x,y) \leq z_{min}$ or $z_{j*}(x,y) \geq z_{max}$, the optimal distance $z_{j*}(x,y)$ is invalidated. The clearness indicator $C_j(x,y)$ corresponding to such a distance is then invalidated. For this radial position, steps 130 and 140 may then be reiterated. Such an embodiment makes it possible to prevent elements located outside of the sample, for example dust on the holding element 15, or on the image sensor 16, from being considered to form part of the sample 10.

According to one such embodiment, step 150 is optional. In this case, the method allows an optimal distance to be obtained at each radial position in question, without necessarily resulting in an observation image of the sample.

Figure 6:
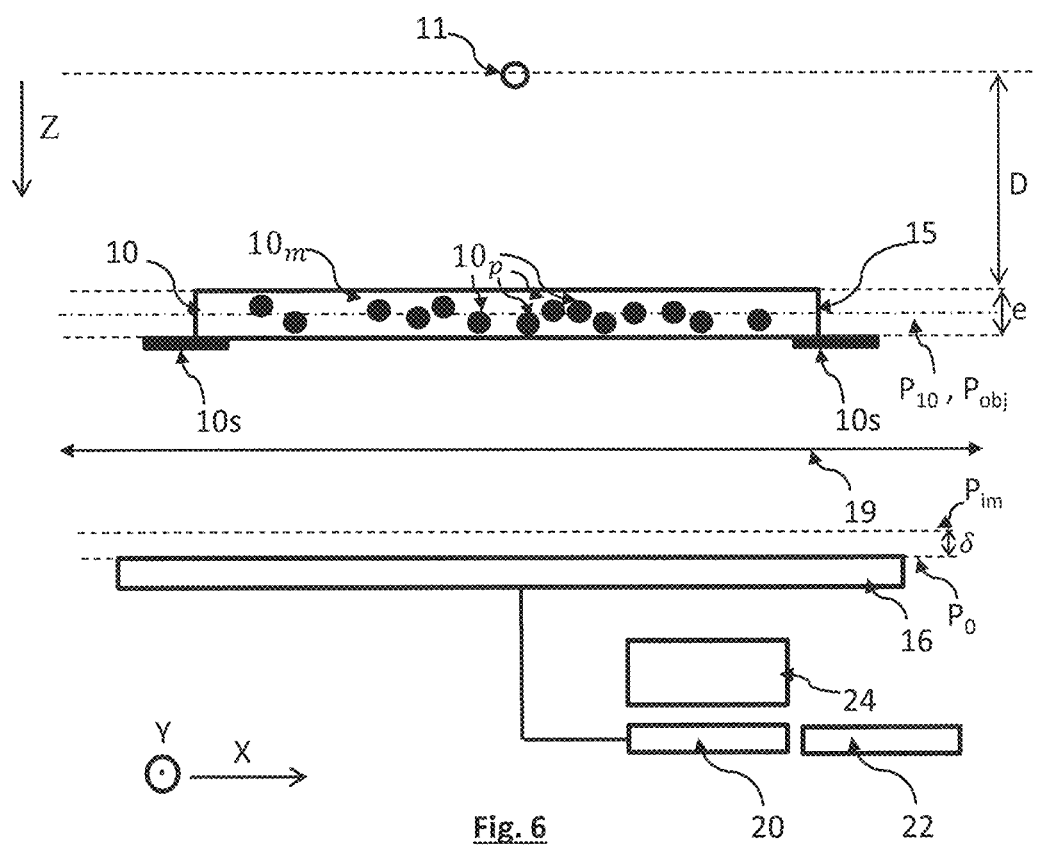
FIG. 6 is another example of a device suitable for implementing the invention.

According to one variant, an image-forming optic is placed between the sample and the image sensor. According to one variant, illustrated in FIG. 6, the device comprises an optical system 19, defining an object plane $P_{obj}$ and an image plane $P_{im}$. The image sensor 16 is then arranged in a so-called defocused configuration, in which the sample lies in a plane that is offset with respect to the object plane, and/or the image sensor lies in a plane that is offset with respect to the image plane. By defocused configuration, what is meant is a configuration comprising an offset of the sample and/or of the image sensor with respect to a focused configuration, in which the detection plane $P_0$ is conjugated with a plane $P_{10}$ in which the sample lies. The offset δ is preferably smaller than 500 μm, or even than 200 μm. It is preferably larger than 10 μm or 20 μm. In the same way as in a lensless configuration, such a configuration allows an image to be obtained in which each microorganism appears in the form of a diffraction pattern, interference occurring between the light wave emitted by the light source and that propagates to the image sensor and a diffracted wave generated by each particle of the sample. In the example shown in FIG. 6, the object plane $P_{obj}$ is coincident with a plane $P_{10}$ in which the sample lies and the image plane $P_{im}$ is offset with respect to the detection plane $P_0$. The method described with reference to steps 100 to 150 is applicable to images acquired in such a configuration. However, a lensless-imaging configuration is preferred, because of the larger field of view that it procures.

Nonlimitingly, the invention may be implemented in the field of diagnostics, of biology, or in inspection of the environment, or even in the field of food processing or of control of industrial processes.

The invention claimed is:

1. Method for observing a sample, the sample comprising particles, comprising the following, steps:
   a) illuminating the sample using a light source, the light source emitting an incident light wave that propagates toward the sample along a propagation axis;
   b) acquiring, using an image sensor, an image of the sample, which image is formed in a detection plane, the sample being, placed between the light source and the image sensor, the image being representative of an exposure light wave, to which the image sensor is exposed under the effect of the illumination, the image comprising pixels, each pixel corresponding to a defined radial position in a plane parallel to the detection plane;

c) forming a stack of complex images, called reconstructed images, from the image acquired in step b), each reconstructed image being obtained by applying, for one reconstruction distance along the propagation axis, a numerical propagation operator, the stack of images comprising as many reconstructed images as there are different reconstruction distances, each reconstructed image being representative of an exposure light wave to which the image sensor is exposed;

d) from each image of the stack of images, computing a clearness indicator for various radial positions, corresponding to different particles, each clearness indicator being associated with one radial position and with one reconstruction distance;

e) taking into account a selection criterion;

f) for each radial position, and depending on the selection criterion, selecting one clearness indicator among, the various clearness indicators defined, at the radial position, from the various reconstructed images, the selected clearness indicator being associated with a reconstructed image that is optimal for the radial position in question; and g) forming an observation image of the sample, each pixel of which is associated with one radial position, the value of pixels of the observation image being determined depending on the value, at the radial position of the pixel, of the optimal reconstructed image that is associated therewith;

wherein, in step d):
each clearness indicator is computed from one elementary image, the elementary image being established from a modulus and/or an argument and/or a real part and/or an imaginary part of a reconstructed image; and each clearness indicator is established while considering a gradient of the elementary image in one or more gradient directions, and wherein:
the method comprises, following step f) determining, for each radial position in question, an optimal distance, corresponding to the reconstruction distance of the optimal reconstructed image associated with the radial position, the optimal distances respectively determined with respect to at least two position, corresponding to at least two differ particles, being different, and in g), the observation image shows particles, lying in different radial positions, with different optimal distances.

2. Method according to claim 1, wherein step d) comprises, for each reconstructed image of the stack of images:
computing a gradient image representative of a gradient of the reconstructed image in at east one gradient direction; and
computing a norm of the gradient image;
such that the clearness indicator, in each radial position, is obtained from the norm of the gradient image at the radial position.

3. Method according to claim 2, wherein step d) comprises:
computing a gradient image respectively along two orthogonal axes defining a radial plane orthogonal to the propagation axis; and
combining each computed gradient image so as to form a two-dimensional gradient image;
such that each two-dimensional gradient image is representative of a two-dimensional gradient of one reconstructed complex image.

4. Method according to claim 1, wherein step f) comprises taking into account a range of validity, and rejecting a selected dearness indicator if the reconstruction distance that is associated therewith is not comprised in the range of validity.

5. Method according to claim 1, wherein, in step g), the observation image, at each radial position, is obtained from die optimal reconstructed image for the radial position in question.

6. Method according to claim 1, wherein no image-forming optic is placed between the sample and the image sensor.

7. Method according to claim 1, wherein an optical system is placed between the sample and the image sensor, the optical system conjugating an image plane with an object plane, the detection plane being offset with respect to the image plane and/or the sample being offset from the object plane, such that the image acquired by the image sensor is a defocused image of the sample.

8. Method according to claim 1, wherein the sample is held in or on holding element, the sample being immobile with respect to the holding element.

9. Method according to claim 1, wherein the sample contains particles, the method comprising a step h) of characterizing the particles from the observation image of the sample, the characterization comprising:
counting the particles:
and/or determining a size and/or a shape of the particles;
and/or counting particles depending on their size and/or their shape;
and/or determining a three-dimensional position of the particles.

10. Device for identifying a sample, comprising:
a light source configured to emit an incident light wave that propagates toward the sample;
an image sensor configured to acquire an image of the sample;
a holder, configured to hold the sample between the light source and the image sensor; and
a processor, configured to receive an image of the sample from the image sensor, and to implement steps c) to g) of the method according to claim 1.

11. Device according to claim 10, wherein no image-forming optic is placed between the sample and the image sensor.

12. Device according to claim 10, comprising an optical system defining a focused configuration, in which the image sensor is conjugated with a plane passing through the sample, the device being such that the image sensor or the sample are offset with respect to the focused configuration, such that, in step b), the image sensor acquires a defocused image of the sample.

13. Method according to claim 1, comprising:
obtaining a plurality of three-dimensional positions for which observation of the sample is considered to be clear; and
forming the observational image of the sample using the stack of images and the plurality of three-dimensional positions.

14. Method for observing a sample, comprising the following steps:
a) illuminating the sample using a light source, the light source emitting an incident light wave that propagates toward the sample along a propagation axis;
b) acquiring, using an image sensor, an image of the sample, which image is formed in a detection plane, the sample being placed between the light source and the image sensor, the image being representative of an exposure light wave, to which the image sensor is exposed under the effect of the illumination, the image comprising pixels, each pixel corresponding to a defined radial position in a plane parallel to the detection plane;

c) forming a stack of complex images, called reconstructed images, from the image acquired in step b), each reconstructed image being obtained by applying, for one reconstruction distance along the propagation axis, a numerical propagation operator, the stack of images comprising as many reconstructed images as there are different reconstruction distances, each reconstructed image being representative of an exposure light wave to which the image sensor is exposed;

d) from each image of the stack of images, computing a clearness indicator for various radial positions, each clearness indicator being associated with one radial position and with one reconstruction distance;

e) taking into account a selection criterion;

f) for each radial position, and depending on the selection criterion, selecting one clearness indicator among the various clearness indicators defined, at the radial position, from the various reconstructed images, the selected clearness indicator being associated with a reconstructed image that is optimal for the radial position in question;

g) forming an observation image of the sample, each pixel of which is associated with one radial position, the value of pixels of the observation image being determined depending on the value, at the radial position of the pixel, of the optimal reconstructed image that is associated therewith;

wherein, in step d);

each clearness indicator is computed from one elementary image, the elementary image being established from a modulus and/or an argument and/or a real part and/or an imaginary part of a reconstructed image; and each clearness indicator is established while considering a gradient of the elementary image in one or more gradient directions, obtaining a plurality of three-dimensional positions for which observation of the sample is considered to be clear; and forming the observational image sample using the stack of images and the plurality of three-dimensional positions.

* * * * *